(12) United States Patent  
Gu et al.

(10) Patent No.: US 9,152,652 B2  
(45) Date of Patent: Oct. 6, 2015

(54) SUB-QUERY EVALUATION FOR IMAGE SEARCH

(71) Applicant: Google Inc., Mountain View, CA (US)

(72) Inventors: Kunlong Gu, Belmont, PA (US); Charles J. Rosenberg, Cupertino, CA (US); Mingchen Gao, San Jose, CA (US); Thomas J. Duerig, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/828,254

(22) Filed: Mar. 14, 2013

(65) Prior Publication Data

US 2015/0169631 A1   Jun. 18, 2015

(51) Int. Cl.  
*G06F 17/30* (2006.01)

(52) U.S. Cl.  
CPC ................. *G06F 17/30244* (2013.01)

(58) Field of Classification Search  
CPC .......... G06F 17/30265; G06F 17/30256; G06F 17/30672; G06F 17/30867; G06F 17/30244; G06K 9/4676; G06K 9/6211; G06K 9/6212; Y10S 707/99933; Y10S 707/99937; Y10S 707/99948  
USPC ............. 1/1; 707/999.005, 999.107, 723; 715/811  
See application file for complete search history.

(56) References Cited

U.S. PATENT DOCUMENTS

| | | | |
|---|---|---|---|
| 5,983,237 A * | 11/1999 | Jain et al. | 1/1 |
| 6,308,149 B1 | 10/2001 | Gaussier et al. | |
| 8,874,557 B2 * | 10/2014 | Lin et al. | 707/723 |
| 2003/0212666 A1 * | 11/2003 | Basu et al. | 707/3 |
| 2005/0120311 A1 * | 6/2005 | Thrall | 715/811 |
| 2007/0174269 A1 * | 7/2007 | Jing et al. | 707/5 |
| 2009/0037239 A1 * | 2/2009 | Wong et al. | 705/7 |
| 2009/0063462 A1 | 3/2009 | Alfonseca et al. | |
| 2009/0198671 A1 * | 8/2009 | Zhang et al. | 707/5 |

* cited by examiner

*Primary Examiner* — Dennis Truong  
(74) *Attorney, Agent, or Firm* — Fish & Richardson P.C.

(57) ABSTRACT

Methods, systems, and apparatus, including computer programs encoded on a computer storage medium, for Methods, systems, and apparatus, including computer programs encoded on a computer storage medium, for identifying images responsive to a search phrase are disclosed. In one aspect, a method includes identifying a set of responsive images for a search phrase that includes two or more terms. Interaction rankings are determined for images in the set of responsive images. Two or more sub-queries are created based on the search phrase. Sub-query model rankings are determined for images in the set of responsive images. A search phrase score is determined for the image relevance model. Based on the search phrase scores for the sub-queries, one of the sub-query models is selected as a model for the search phrase.

20 Claims, 6 Drawing Sheets

SUB-QUERY EVALUATION FOR IMAGE SEARCH

BACKGROUND

This specification relates to information retrieval.

The Internet provides an opportunity for users to share images and for content providers to disseminate information by way of images. Identification of images that are relevant to a particular query can be based, for example, on textual information associated with the image and visual characteristics of the image. For example, a search system can identify images that are associated with textual information that is related to the query and an image relevance model that has been trained for a particular query can provide a measure of visual relevance of an image to the particular query based on visual characteristics of the image.

SUMMARY

Image search systems utilize image relevance models to select and/or rank images that are provided in response to a query. For example, image relevance models can be trained for particular search phrases (e.g., queries including two or more terms), and used to identify and/or rank images that are provided to a user device in response to receipt of the particular search phrase. Due to the large number of potential search phrases, there may be search phrases (e.g., search queries that include two or more terms) for which an image relevance model is not available. In these situations, an image relevance model for a proper subset of the terms in the search phrase may be used to select and/or rank images that will be provided when the search phrase is received. For example, if an image relevance model has not been trained for the search phrase "birthday cakes for boys," an image relevance model that has been trained for either "birthday," "cakes," "birthday cakes," or "boys" can be used to identify and/or rank images that will be provided in response to the search phrase "birthday cakes for boys." For brevity and clarity, an image relevance model for a sub-query is referred to in this document as a "sub-query model."

As illustrated above, there may be more than one sub-query model that can be used to identify and/or rank images to be provided in response to a particular search phrase. For example, the sub-query models that may be used to identify and/or rank images for the search phrase "birthday cakes for boys" include a sub-query model for "birthday," a sub-query model for "birthday cake," a sub-query model for "cake," and a sub-query model for "boys." In some implementations, the sub-query model that is used to identify and/or rank images for a particular search phrase is the sub-query model that ranks images identified using the search phrase similar to an order of the images resulting from ranking the images according to a number of user interactions with the images when provided in response to the search phrase.

For example, assume that when provided in response to the search phrase "birthday cakes for boys" image 1 was clicked (or otherwise interacted with) by users a highest number of times, image 2 was clicked a second highest number of times, and that image 3 was clicked a third highest number of times. In this example, ranking the images based on a number of user clicks would result in image 1 being the highest ranked image, image 2 being the second highest ranked image, and image 3 being the third highest ranked image. In this example, if the sub-query model for "birthday cakes" ranked image 1 highest, image 2 second highest, and image 3 third highest, then the ranking provided by the sub-query model "birthday cakes" is the same as the ranking based on the number of user clicks. Assuming, for purposes of this example, that none of the other sub-query models for the search phrase "birthday cakes for boys" produced the same ranking, the sub-query model for "birthday cakes" could be used to identify and/or rank images to be provided in response to the search phrase "birthday cakes for boys."

Throughout this document, a ranking of images based on a number of user interactions is referred to as an interaction ranking, and the ranking of images based on a sub-query model is referred to as a sub-query model ranking Additionally, a measure of similarity between the interaction ranking and the sub-query model ranking is referred to as a search phrase score for the sub-query model.

Some sub-queries can be identified as global sub-queries, and the sub-query model for a global sub-query can generally be used to identify and/or rank images for search phrases that contain the sub-query. As described in more detail below, the identification of a sub-query as a global sub-query can made by analyzing the rankings of the sub-query model for the sub-query across multiple different search phrases that include the sub-query. For example, the search phrase scores that were generated for the sub-query model with respect to multiple different search phrases can be aggregated, and the sub-query can be considered a global sub-query if the aggregate search phrase score meets a specified value.

A single search phrase may contain multiple sub-queries for which a sub-query model is available, and in some implementations, multiple different sub-query models can be used to identify and/or rank the images that are provided in response to the search phrase. For example, assume that the query phrase "birthday cake candles" is received, and that a sub-query model exists for each of the sub-queries "birthday cake" and "birthday candles." In this example, images could be identified using both of the available sub-query models, and the ranking of each identified image could be based on the output of only one of the sub-query models or could be based on the output of both of the sub-query models. For example, the ranking of each image could be based on the highest score output by either sub-query model or based on some combination (e.g., an average or weighted sum) of the scores output by each of the sub-query models.

In general, one innovative aspect of the subject matter described in this specification can be embodied in methods that include the actions of identifying a set of responsive images for a search phrase that includes two or more terms; determining interaction rankings for images in the set of responsive images; the interaction ranking of each image being based on a number of user interactions with the image relative to a number of user interactions with other images in the set; creating two or more sub-queries based on the search phrase, the sub-queries each being a proper subset of the two or more terms; for each sub-query from the two or more sub-queries: determining sub-query model rankings for images in the set of responsive images, the sub-query model ranking of each image being determined based on a sub-query model for the sub-query and features of the images, the sub-query model being an image relevance model for the sub-query; and determining a search phrase score for the image relevance model, the search phrase score being a measure of similarity between the interaction rankings of the images and the sub-query model rankings of the images; and selecting, based on the search phrase scores for the sub-queries, one of the sub-query models as a model for the search phrase, the selected sub-query model having a search phrase score that meets a threshold search phrase score.

Other embodiments of this aspect include corresponding systems, apparatus, and computer programs, configured to perform the actions of the methods, encoded on computer storage devices.

These and other embodiments can each optionally include one or more of the following features. Determining interaction rankings for images in the set of responsive images can include the actions of ranking a first image from the set of responsive images as a highest ranked image, the first image having a highest number of user interactions among the images in the set of responsive images; ranking a second image from the set of responsive images as a second highest ranked image, the second image having a second highest number of user interactions among the images in the set of responsive images; and ranking each unranked image in the set of responsive images in descending order according to the number of user interactions with the image.

Methods can include the action of creating an interaction histogram based on the interaction rankings and the numbers of user interactions with the images. Methods can include the action of creating a sub-query histogram based on the sub-query model rankings and the number of user interactions with the images.

Determining a search phrase score can include determining a level of match between the interaction histogram and the sub-query histogram; and determining the search phrase score based on the level of match between the interaction histogram and the sub-query histogram.

Methods can include the actions of obtaining, for the sub-query model of the selected sub-query, an additional search phrase score specifying a measure of similarity between interaction rankings of other images responsive to another search phrase and sub-query model rankings of the other images based on the sub-query model; and determining a global search phrase score for the sub-query model, the global search phrase score being determined based on an aggregate measure of the search phrase score and the additional search phrase score.

Methods can include the actions of determining that the global search phrase score for the sub-query model meets a global search phrase score threshold; identifying the sub-query as a global sub-query based on the determination that the global search phrase score meets the global search phrase threshold; and ranking images for at least one additional search phrase that includes the sub-query and at least one other term.

Particular embodiments of the subject matter described in this specification can be implemented so as to realize one or more of the following advantages. The use of query-specific image relevance models can be extended to search phrases for which a query-specific image relevance model is not available. For example, images responsive to a search phrase can be ranked using a sub-query model even if an image relevance model is not available for that search phrase.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
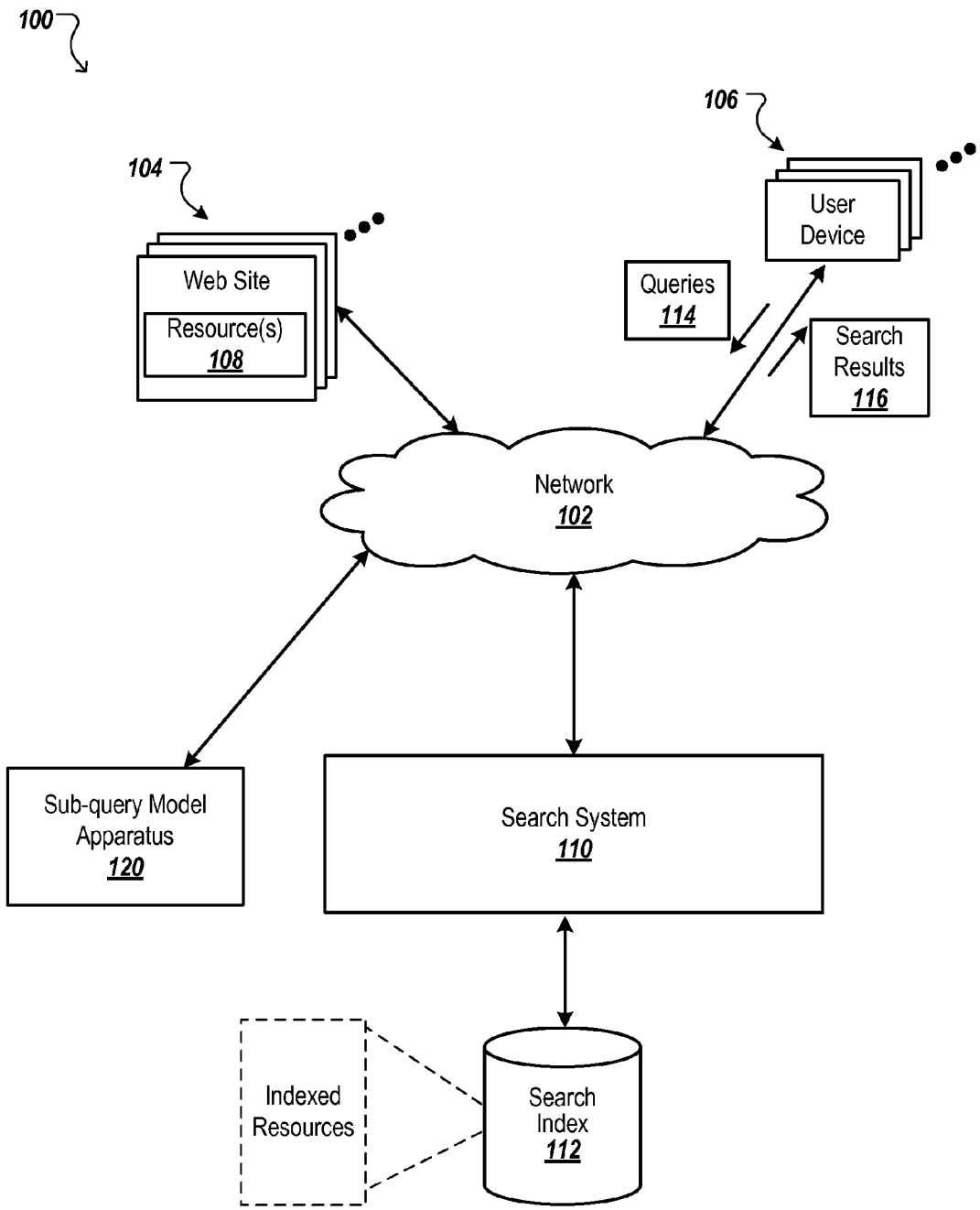
FIG. 1 is a block diagram of an example environment in which a search system provides search services.

FIG. 1 is a block diagram of an example environment 100 in which a search system 110 provides search services. The example environment 100 includes a network 102 (e.g., a local area network (LAN), wide area network (WAN), the Internet, or a combination of networks) that connects web sites 104, user devices 106, and the search system 110. The environment 100 may include any number of web sites and user devices 106.

A web site 104 is one or more resources 108 associated with a network domain and hosted by one or more servers. An example web site is a collection of web pages formatted in hypertext markup language (HTML) that can contain text, images, multimedia content, and programming elements, e.g., scripts. Each web site is maintained by a publisher (i.e., an entity that manages and/or owns the web site).

A resource 108 is data that can be provided over the network 102 and that is associated with a resource address. Resources 108 include HTML pages, word processing documents, and portable document format (PDF) documents, images, video, and feed sources, to name just a few. The resources 108 can include content, e.g., words, phrases, images and sounds and may include embedded information (e.g., meta information and hyperlinks) and/or embedded instructions (e.g., scripts).

A user device 106 is an electronic device that is capable of requesting and receiving resources over the network 102. Example user devices 106 include personal computers, mobile communication devices, and other devices that can send and receive data over the network 102. A user device 106 typically includes a user application (e.g., a web browser) to facilitate the sending and receiving of data over the network 102, as well as presentation of data to a user.

To facilitate searching of resources 108, the search system 110 identifies the resources 108 by crawling and indexing the resources 108 provided by the publishers 104. Data about the resources 108 can be indexed based on the resource 108 to which the data corresponds as well as metadata for the corresponding resource. The indexed resources 108 are stored in a search index 112.

The user devices 106 submit search queries 114 to the search system 110. In response, the search system 110 accesses the search index 112 to identify resources 108 that are deemed relevant to the search query 109, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text, an image, or a portion of an image extracted from the web page, and the URL of the web page.

User devices 106 receive the search results 116 and render the search results 116, for example, in the form of one or more web pages, for presentation to users. In response to user interaction with a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Image search results can be selected and/or ordered for presentation based, at least in part, on an image relevance model. An image relevance model can be trained to identify images that are relevant to a query based on visual features of the image, for example, using visual features of images that have been provided to user devices from which search queries were received and user feedback data indicating which of the images the users interacted with. Once trained, an image relevance model can be used to select and/or rank images for presentation at a user device from which a search query was received. For example, the visual features of each image can be input to the image relevance model, and the output of the image relevance model can be used as a relevance score for the image or used to adjust a relevance score for the image. The images can then be ranked based, at least in part, on the relevance scores, and the highest ranking N images can be presented on an image search results page, where N is an integer.

Image relevance models can generally be trained on a per-query basis, where each query is a set of one or more terms. For example, one image relevance model can be trained for the query "birthday," while another image relevance model can be trained for "birthday cake." When a query received from a user device matches the query for which an image relevance model has been trained, that image relevance model can be used to generate or adjust relevance scores for images responsive to that query.

Although image relevance models can be trained on a per-query basis, the search systems enable users to submit free-text queries. Thus, there are many millions of combinations of terms that can each constitute different queries. For example, two users that are each searching for images that provide birthday cake ideas for a 6 year old boy may respectively submit the search queries "6 year old birthday cake" and "birthday cake for boy 6." Although each of these search queries is likely requesting a similar set of images, these may be considered to be two unique queries since they are not identical. Therefore, if an image relevance model has been trained for only one of these queries, the search system may not be configured to use that image relevance model for the other search query. Accordingly, there may not be an image relevance model available for the other search query.

The environment 100 includes a Sub-Query Model Apparatus 120. The Sub-query Model Apparatus 120 is a data processing apparatus that identifies sub-query models to be used for selecting and/or ranking images for search phrases (e.g., search queries that include two or more terms) that include the sub-query for which the sub-query model has been trained. For example, assume that an image relevance model is not available for the search phrase "birthday cake for boy," but an image relevance model is available for each of the search phrases "birthday cake," and "boy." Since the phrases "birthday cake" and "boy" each includes a proper subset of the terms in the phrase "birthday cake for boy," the Sub-Query Model Apparatus 120 can consider each of the phrases "birthday cake" and "boy" sub-queries of the search phrase "birthday cake for boy," and determine whether the image relevance model for "birthday cake" or the image relevance model for "boy" should be used to generate or adjust image relevance scores for the search phrase "birthday cake for boy."

In some implementations, the Sub-Query Model Apparatus 120 evaluates the performance of one or more sub-query models (e.g., image relevance models for sub-queries of a search phrase) when used to rank images that are responsive to a search phrase. Based on the evaluation, the Sub-Query Model Apparatus 120 can determine whether to use one of the sub-query models to generate or adjust image relevance scores for images responsive to one or more search phrases that include the sub-query for which the sub-query model was trained.

As discussed in more detail below, the evaluation of a sub-query model can include determining a measure of similarity between sub-query model rankings of the images that have been identified using the search phrase (e.g., image rankings generated based on the output of the sub-query model) and interaction rankings of the images that have been identified using the search phrase (e.g., rankings of the images based on a number of user interactions with the images when provided in response to receipt of the search phrase). For example, the Sub-Query Model Apparatus 120 can determine, for a particular sub-query model, whether there exists at least a threshold level of similarity between the sub-query model rankings generated using the particular sub-query model and the interaction rankings of the images that have been provided in response to the search phrase. If at least the threshold level of similarity is determined to exist, the Sub-Query Model Apparatus 120 can designate the sub-query model as an image relevance model for the search phrase. The measure of similarity between the interaction rankings and sub-query model rankings is referred to as a search phrase score, which can be compared to a search phrase score threshold to determine whether the threshold level of similarity exists.

In some implementations, the Sub-Query Model Apparatus 120 may determine that a particular sub-query model is to be used for multiple different search phrases that include the sub-query for which the sub-query model was created. For example, the Sub-Query Model Apparatus 120 can identify a set of search phrases that each includes the sub-query, and for each of the search phrases, obtain a search phrase score for the sub-query model. The Sub-Query Model Apparatus 120 can determine an aggregate search phrase score for the sub-query model based on the obtained search phrase scores. If the aggregate search phrase score meets a specified value, the Sub-Query Model Apparatus 120 can designate the sub-query as a global sub-query, and use the sub-query model for the global sub-query to generate and/or adjust relevance scores for additional search phrases that include the sub-query. In some implementations, at least one of the search phrases for which the sub-query model for the global sub-query is used to generate and/or adjust the relevance scores is a search phrase for which the Sub-Query Model Apparatus 120 did not obtain a search phrase score for the sub-query model.

Figure 2:
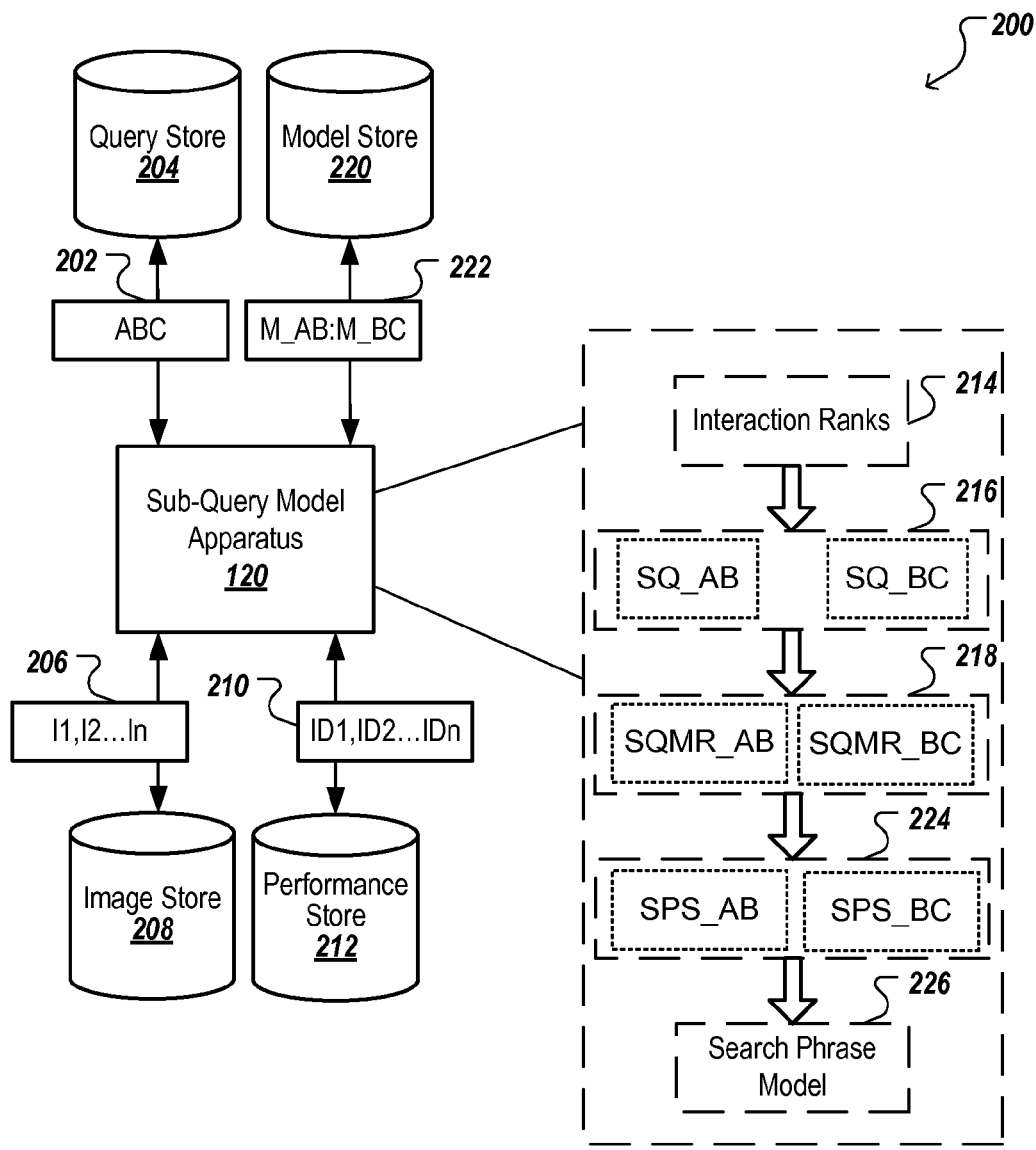
FIG. 2 is a block diagram illustrating an example data flow for selecting a sub-query model for a search phrase.

FIG. 2 is a block diagram illustrating an example data flow 200 for selecting a sub-query model for a search phrase. The data flow 200 begins with the Sub-Query Model Apparatus 120 identifying a search phrase 202 that includes two or more terms. In some implementations, the search phrase 202 can be identified from a query store 204 that stores queries that have been received from user devices. For example, as illustrated by FIG. 2, the search phrase ABC can be obtained from the query store 204, where each of A, B, and C represent a separate term in the search phrase.

Using the search phrase 202, the Sub-Query Model Apparatus 120 identifies a set of responsive images 206 for the search phrase 202. The set of responsive images 206 can include multiple images (I1, I2 . . . In) that are provided in response to the search phrase 202. In some implementations, the set of responsive images 206 can be identified from an image store 208 that stores images. The images in the image store can be indexed, for example, according to the queries in response to which the images have been previously provided to user devices. Therefore, the Sub-Query Model Apparatus 120 can identify, as the set of responsive images 206, the images that are indexed to the search phrase 202. In some implementations, the Sub-Query Model Apparatus 120 can identify the set of responsive images 206 by submitting the search phrase 202 to a search system and receiving, from the search system, data identifying the set of responsive images 206.

The Sub-Query Model Apparatus 120 obtains interaction data 210 (e.g., ID1, ID2 . . . IDn) for the images in the set of responsive images 206. In some implementations, the interaction data 210 for each image specifies a number of user interactions with the image when provided as a search result for the search phrase. For example, the interaction data 210 for a particular image can specify how many user clicks the image received when presented as a search result for the search phrase. Additionally, the interaction data 208 can specify a number of times that users hovered an electronic pointer over the image for at least a threshold amount of time (e.g., to view an enlarged version of the image) when presented as a search result for the search phrase. In some implementations, the number of user interactions with an image is determined based on a total number of user clicks, user hovers, and/or other user interactions with the image. In some implementations, only a proper subset of interaction types are considered for determining the number user interactions with the image (e.g., only the user clicks or user hovers).

The interaction data 210 can be obtained, for example, from a performance store 212 in which the interaction data 210 are stored. In some implementations, the interaction data 210 are indexed in the performance store with a reference to the image to which the interaction data correspond. Thus, the Sub-Query Model Apparatus 120 can obtain the interaction data 210 by requesting interaction data corresponding to the images that are included in the set of responsive images 206.

Figure 3A:
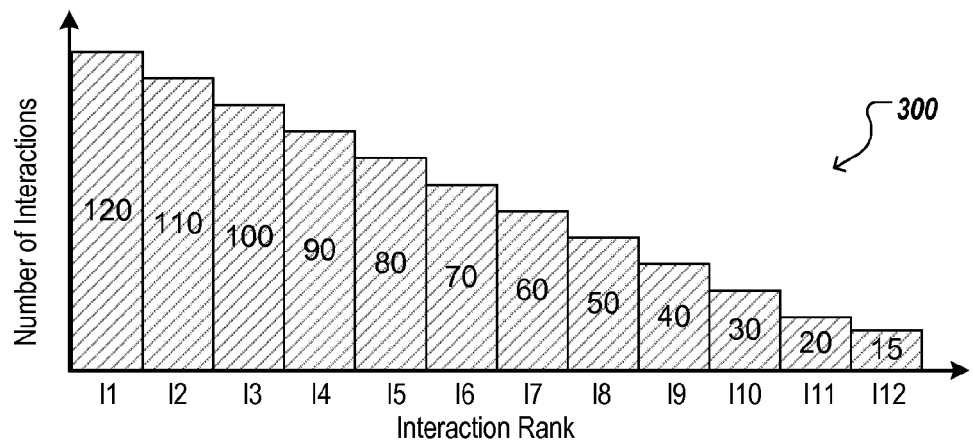
FIG. 3A is a graph representing an example interaction ranking of a set of responsive images.
Figure 3B:
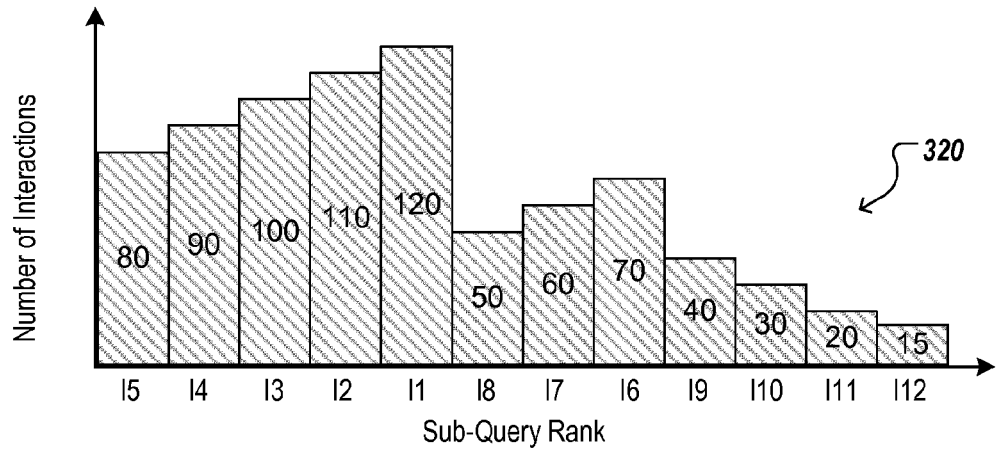
FIG. 3B is a graph representing an example sub-query model ranking of images.
Figure 3C:
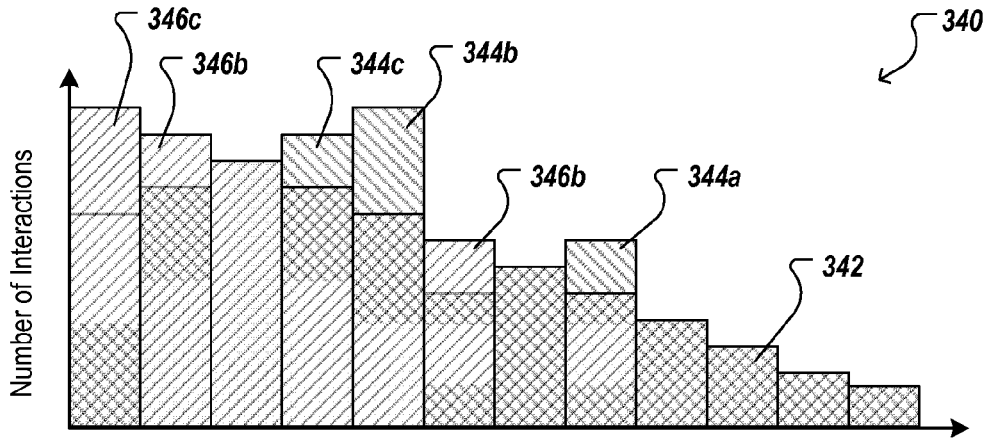
FIG. 3C is a graph representing an example technique for comparing the interaction ranking to the sub-query model ranking.

The Sub-Query Model Apparatus 120 determines interaction rankings 214 for images in the set of responsive images 206. The interaction ranking for each image is a ranking of the image relative to other images in the set of responsive images 206. The ranking of each image is based on the number of user interactions with the image when the image was presented as a search result for the search phrase. In some implementations, the images are ranked in descending order of the total number of user interactions with the image from a search results page provided in response to the search phrase. Other ranking methodologies are also possible. For example, the images could be ranked based on an interaction rate for the image (e.g., number of user interactions/number of presentations of the image as a search result for the query). Additionally, or alternatively, the number of user interactions for each image can be normalized to a reference value so that the number of user interactions with each image can be directly compared. An example interaction ranking is illustrated in FIGS. 3A-3C, and discussed below.

The Sub-Query Model Apparatus 120 creates, or identifies, a set of sub-queries 216. In some implementations, each sub-query is a proper subset of the terms that are included in the search phrase. For example, as illustrated in FIG. 2, the sub-queries for the search phrase ABC (where A, B, and C each represent a different term in the search phrase), can include a sub-query including only terms AB (e.g., SQ_AB) and another sub-query including terms BC (e.g., SQ_BC). In this example, each of the sub-queries is a contiguous set of two terms from the search phrase. In some implementations, the sub-queries for a search phrase can include non-contiguous sets of terms from the search query. For example, when non-contiguous sets of terms are used to create sub-queries, the sub-queries created for the search phrase ABC can include the sub-query AC.

The Sub-Query Model Apparatus 120 determines, for each of the sub-queries, a sub-query model ranking of the images in the set of responsive images 206. In some implementations, the Sub-Query Model Apparatus 120 determines sub-query model rankings of the images by applying a sub-query model (e.g., an image relevance model for the sub-query) to each image in the set of responsive images 206. For example, for each image the Sub-Query Model Apparatus 120 can compute a dot product of the sub-query model and image feature values of the image to obtain a model relevance value indicating the relevance of the image to the sub-query. In turn, the Sub-Query Model Apparatus 120 can rank the images in decreasing order of the relevance values for the images. This resulting ranking is an example of a sub-query model ranking of the images. The example above refers to computing a dot product, but other techniques can be used to apply a sub-query model to an image. For example, a cosine distance (or another measure of similarity) between the values of the sub-query model and the image feature values of the image can be used to determine the relevance value.

In some implementations, the Sub-Query Model Apparatus 120 obtains the sub-query model for each sub-query from a model store 220 that stores image relevance models. The image relevance models that are stored in the model store 220 can be indexed according to (or otherwise stored with a reference to) the query for which the image relevance model was trained. Therefore, the Sub-Query Model Apparatus 120 can request, from the model store 220, image relevance models that have been trained for queries matching the sub-queries that are included in the set of sub-queries 216. In response to the request, the Sub-Query Model Apparatus 120 can receive a set of image relevance models 222 that includes the image relevance models that have been trained for queries matching sub-queries in the set of sub-queries 216 (e.g., models M_AB and M_BC). These received image relevance models 222 are the sub-query models that will be evaluated for use as an image relevance model for the search phrase.

The Sub-Query Model Apparatus 120 determines a set of search phrase scores 224 for the sub-query models. The set of search phrase scores 224 can include a search phrase score for each sub-query model that was received from the model store 220. In some implementations, the search phrase score for a sub-query model is based on a similarity between the interaction rankings of the images in the set of responsive images 206 and the sub-query model rankings of the images that result from applying the sub-query model to the images. For example, assume that a first sub-query model ranking for a first sub-query model is more similar to the interaction ranking of the images than a second sub-query model ranking for a second sub-query model. In this example, the first sub-query model will have a higher search phrase score than the second sub-query model. The determination of a search phrase score is described in more detail with reference to FIGS. 3A-3C

The Sub-Query Model Apparatus 120 selects one of the sub-query models as a model for the search phrase, which is referred to as a search phrase model. In some implementations, the sub-query model that is selected from the available sub-query models as the search phrase model is the sub-query model having a search phrase score that meets a threshold search phrase score. For example, the sub-query model having the highest search phrase score can be selected as the search phrase model (e.g., where the second highest search phrase score can be considered the threshold search phrase score).

The threshold search phrase score can be an absolute or relative value. For example, the threshold search phrase score can be specified to represent the Nth highest search phrase score (where N is a non-zero integer). Additionally, or alternatively, the threshold search phrase score can be specified as a minimum search phrase score that a sub-query model must have to be selected as a search phrase model for the search phrase. The threshold search phrase score can be specified on a per-search-phrase basis. Therefore, two different search phrases can have different threshold search phrase scores.

The search phrase model can be used to generate and/or adjust relevance scores for the responsive images for the search phrase. In some implementations, the model relevance values generated by applying the search phrase model to the feature values of the responsive images are used to adjust relevance scores for the images in the set of responsive images 206. For example, assume that the range of model relevance values is between 0.0 and 1.0, with the score of 0.0 indicating that, according to the model, an image has a minimum amount of relevance to the query and with the score of 1.0 indicating that, according to the model, an image has a maximum amount of relevance to the query. In this example, an adjusted relevance score can be generated by combining (e.g., summing, computing a product, or otherwise combining) the model relevance value for each image with the relevance score that was used to select the images as responsive images. The adjusted relevance score can then be used to rank the images for presentation at a user device.

FIGS. 3A-3C are graphs that together illustrate a manner by which similarities between interaction rankings and sub-query model rankings can be evaluated. FIG. 3A is a graph 300 representing an example interaction ranking of a set of responsive images. As illustrated by FIG. 3A, the interaction ranking can be represented by a histogram in which each image is assigned a bin on the horizontal axis, and the number of user interactions with the image is represented by the vertical height of the bin. The images can be ranked in descending order of their respective number of user interactions to represent the interaction rankings. For example, in FIG. 3A, the images I1-I12 are respectively ranked in positions 1-12, which corresponds to the images being ranked in descending order of their respective number of user interactions. In particular, image I1 is associated with 120 user interactions, which is the highest number of user interactions among the images I1-I12, and image I2 is associated with 110 user interactions, which is the second highest number of user interactions among the images I1-I12. Therefore, images I1 and I2 are respectively ranked first and second among the images I1-I12. As described above, the Sub-Query Model Apparatus 120 of FIG. 2 can determine the interaction rankings of the images. Additionally, the Sub-Query Model Apparatus 120 can generate a histogram representing the interaction rankings of the images.

FIG. 3B is a graph 320 representing an example sub-query model ranking of images. The sub-query model ranking of the images I1-I12 can be represented by a histogram in which each image is represented by a bin on the horizontal axis, and the bins can be arranged on the horizontal axis based on the sub-query model ranking of the image. For example, in FIG. 3B, image I5 is a highest ranked image according to the sub-query model ranking and the image I12 is the twelfth ranked image according to the sub-query model ranking. In some implementations, the sub-query model rankings of the images are based on the model relevance value generated for the images by the sub-query model. Thus, as illustrated by FIG. 3B, image I5 is the highest model relevance value among the images I1-I12, while the image I12 has the lowest model relevance value among the images I1-I12.

In FIG. 3B, the vertical height of the bin for each image again represents the number of user interactions with the image. Thus, the histogram presented in the graph of FIG. 3B can be thought of as a rearrangement of the bins of FIG. 3A, where the bins of FIG. 3B are rearranged on the horizontal axis based on the sub-query model rankings.

As described above with reference to FIG. 2, the search phrase score for a sub-query model is based on a similarity between the interaction rankings of responsive images for the search phrase and the sub-query model rankings of the responsive images. FIG. 3C is a graph 340 representing an example technique for comparing the interaction ranking to the sub-query model ranking. The graph 340 can be generated, for example, by combining the graphs 300 and 320. For example, the graph 340 can be generated by overlaying the graph 320 on the graph 300. The cross-hatched portions 342 of the graph 340 represent the portions of the graphs 300 and 320 that overlap. The portions of the graph 340 that are not cross-hatched represent portions of the graphs 300 and 320 that do not overlap. For example, the portions 344a, 344b, and 344c are portions of the graph 320 that are not overlapped by the graph 300, and the portions 346a, 346b, and 346c represent portions of the graph 300 that are not overlapped by the graph 320.

In some implementations, the search phrase score for a sub-query model is based on the amount of overlap between the histogram representing the interaction rankings and the histogram representing the sub-query model rankings generated using the sub-query model. For example, the search phrase score for a sub-query model will generally increase with an increase in the amount of overlap between the histogram for the interaction rankings and histogram for the sub-query model rankings. Similarly, a first sub-query model for which the overlap between the histograms for the interaction rankings and the sub-query model rankings will generally have a higher search phrase score than a second sub-query model for which the overlap between the histograms for the interactions rankings and the sub-query model rankings are lower. The amount of overlap between the histograms for the interaction rankings and the sub-query model rankings can be expressed, for example, by an L1 similarity measure.

Figure 4:
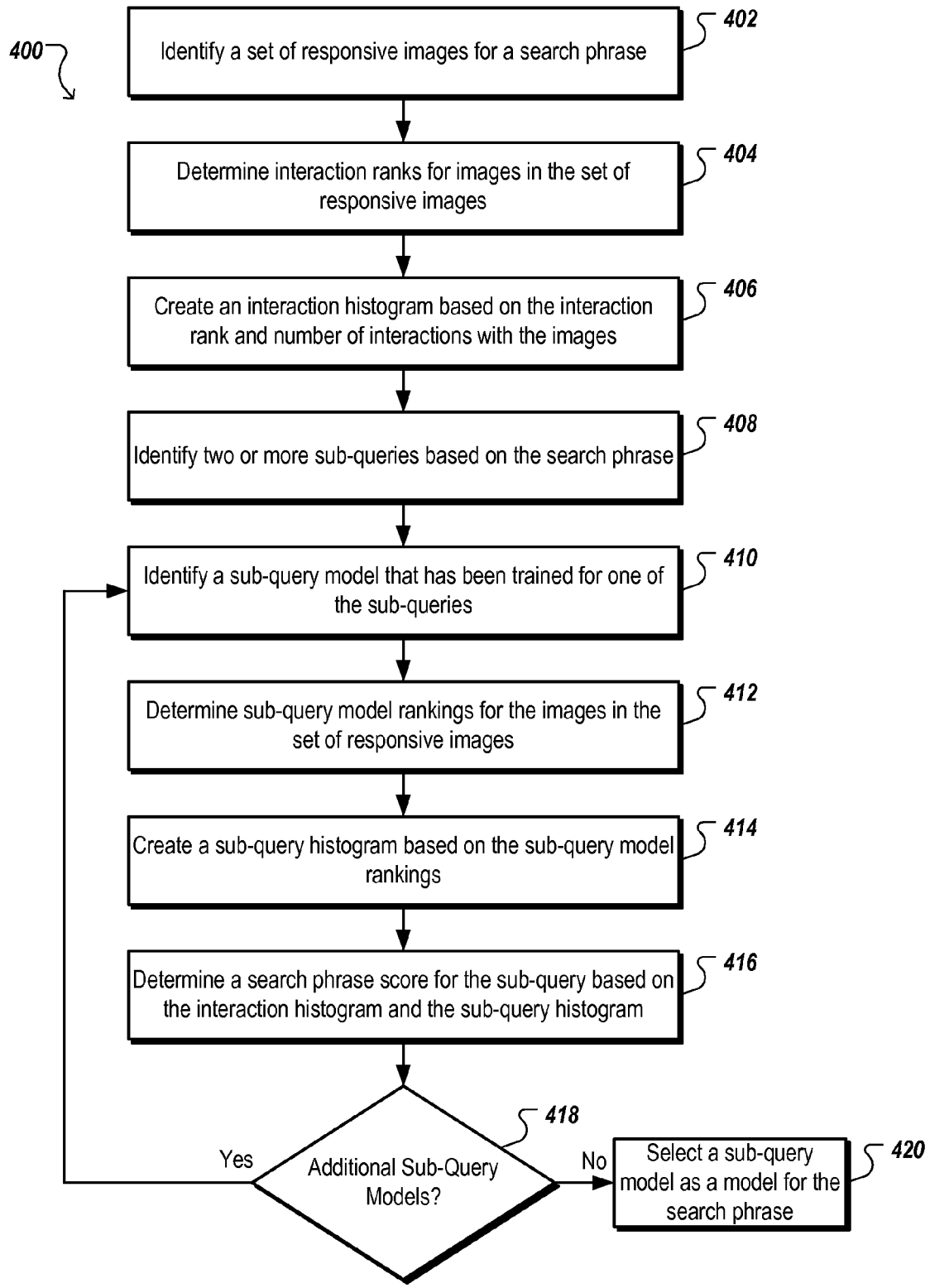
FIG. 4 is a flow chart of an example process for selecting a sub-query model for a search phrase.

FIG. 4 is a flow chart of an example process 400 for selecting a sub-query model for a search phrase. The process 400 can be performed, for example, by the Sub-Query Model Apparatus 120, the search system 110, or another data processing apparatus. The process 400 can also be implemented as instructions stored on computer storage medium, and execution of the instructions by a data processing apparatus can cause the data processing apparatus to perform the operations of the process 400.

A set of responsive images are identified for a search phrase (402). In some implementations, the search phrase is a search query that includes two or more terms. The as described above with reference to FIG. 2, the responsive images for the search phrase can be identified from an image store in which images are indexed according to the search phrases for which the images have been identified as responsive. Alternatively, or additionally, the set of responsive images can be identified as the images returned from a search system in response to submission of the search phrase to the search system.

Interaction rankings are determined for images in the set of responsive images (404). In some implementations, the interaction ranking of each image is based on a number of user interactions with the image relative to a number of user interactions with other images in the set. The number of user interactions can be determined based on a number of times that the image was clicked on or otherwise interacted with (e.g., a user hovering a pointer over the image for at least a threshold amount of time) when presented in a search results page for the search phrase. As described above with reference to FIG. 2, the number of user interactions can be an absolute number of user interactions, a normalized number of user interactions, or a rate of user interactions with the image (e.g., a click-through rate for the image).

Generally, the image associated with the highest number of user interactions will have a highest interaction ranking among the images in the set of responsive images. For example, to generate the interaction rankings a first image having a highest number of user interactions among the images in the set of responsive images can be identified as the highest ranked image. Similarly, a second image having a second highest number of user interactions among the images in the set of responsive images can be identified as a second highest ranked image. Each unranked image in the set of responsive images can continue to be ranked in descending order according to the number of user interactions with the image until each of the images has been ranked. The resulting ranking can be used as the interaction rankings of the images.

An interaction histogram is created based on the interaction rankings of the images and the numbers of user interactions with the images (406). In some implementations, the interaction histogram includes a bin for each of the images in the set of responsive images (or for each image in a proper subset of the images having the highest M interaction rankings, where M is an integer). The number of user interactions with each image is used to determine the height, or amplitude, of the bin for the image, and the bins can be arranged along the horizontal axis in descending order of interaction ranking. An example interaction histogram is illustrated in FIG. 3A.

Two or more sub-queries are identified based on the search phrase (408). In some implementations, each of the sub-queries is a proper subset of the two or more terms in the search phrase. For example, assume that the search phrase is "birthday cakes for boys." In this example, the sub-queries identified for the search phrase can include "birthday," "birthday cakes," and "boys." As discussed above, sub-queries that include two or more terms can be required to be contiguous terms from the search phrase, or the sub-queries can be any combination of terms from the search phrase. The identified sub-queries can also include single term sub-queries (e.g., "birthday").

A sub-query model is identified for one of the sub-queries (410). As discussed above, in some implementations, the sub-query model for the sub-query is an image relevance model that has been trained for a query matching the sub-query. For example, assume that an image relevance model has been trained for the query "birthday cake." In this example, the sub-query "birthday cake" that was created for the search phrase "birthday cake for boys" matches the query "birthday cake" for which the image relevance model was trained. Thus, the image relevance model that was trained for the query "birthday cake" can be identified as the sub-query model in this example.

In some implementations, a match between a sub-query and a query for which an image relevance model has been created can be deemed to exist even if the sub-query and the query are not exactly the same. For example, assume that a model has been created for "birthday cake" and that the sub-query is "birthday cakes." In this example, the sub-query can be deemed to match the query based on the similarity of the two queries.

Sub-query model rankings are determined for images in the set of responsive images (412). In some implementation, the sub-query model ranking of each image is determined based on application of a sub-query model for the sub-query to feature values representing characteristics of the images. For example, a dot product of the sub-query model and image feature values representing visual characteristics of each image can be computed to determine a measure of relevance of the image to the sub-query. A dot product is used for purposes of example, but other similarity functions (e.g., functions that output cosine distances or other distance measures) can be used to determine measures of relevance of images to the sub-query. The value resulting from application of the sub-query model to an image is a relevance value for the image.

As described above, the sub-query model rankings of the images can be determined by ranking the images in descending order according to their respective model relevance values. For example, an image from the set of responsive images having a highest model relevance value (e.g., among the set of responsive images) based on the application of the sub-query model to the image can be identified as a highest ranked image among the set of responsive images, while an image from the set of responsive images having a lowest model relevance value (e.g., among the set of responsive images) can be identified as a lowest ranked image among the set of responsive images.

A sub-query histogram is created based on the sub-query model rankings (414). For example, as illustrated by FIG. 3B, each image can be assigned a histogram bin along the horizontal axis. The bins for the images can be arranged so that the bin representing the highest ranked image (e.g., based on the sub-query model rankings) can be located closest to the vertical axis, and the bins representing the other images can be arranged along the horizontal axis in descending order of their respective sub-query model rankings. The height of each bin (e.g., the distance that each bin extends up the vertical axis) can be based on the number of user interactions with the corresponding image for the bin, as discussed above. For example, as illustrated by FIG. 3B, the bin corresponding to image I5 has a height of 80, which can correspond to 80 user interactions with image I5. Thus, the sub-query histogram is also based on the number of user interactions with the set of responsive images.

A search phrase score is determined for the sub-query model (416). In some implementations, the search phrase score for the sub-query model is determined based on a measure of similarity between the interaction rankings of the images and the sub-query model rankings of the images. For example, as discussed above with reference to FIG. 3C, the search phrase score can be determined based on a level of match (e.g., an amount of overlap) between the interaction histogram and the sub-query histogram. In general, higher levels of match (e.g., amounts of overlap) between the interaction histogram and the sub-query histogram represent higher measures of similarity than lower levels of match (e.g., amounts of overlap) between the interaction histogram and the sub-query histogram. The search phrase score can be determined based on the level of match (e.g., amount of overlap) between the interaction histogram and the sub-query histogram. Thus, higher levels of match (e.g., amounts of overlap) between the interaction histogram and the sub-query histograms will generally correspond to higher search phrase scores than the search phrase scores for lower levels of match (e.g., amounts of overlap). In some implementations, the measure of similarity between the interaction rankings of the images and the sub-query model rankings can be represented by an L1 measure of similarity.

A determination is made whether additional sub-query models are available for evaluation (418). If additional sub-query models are available for evaluation, the process 400 can identify another sub-query model that has been trained for one of the sub-queries and perform the operations discussed above.

If additional sub-query models are not available for evaluation, a sub-query model is selected as the model for the search phrase (420). In some implementations, the sub-query model that is selected as the model for the search phrase is the model for which the search phrase score meets a threshold search phrase score. For example, the sub-query model that is selected as the model for the search phrase can be the sub-query model having the highest search phrase score.

In some implementations, selection of a sub-query model for a search phrase can be conditioned on the search phrase not including an anti-sub-query term. An anti-sub query term is a term indicating that images should be identified and/or ranked based on the search phrase as a whole rather than using sub-query models. For example, in the search phrase "party ideas without birthday cakes," the term "without" can be considered an anti-sub query term since it indicates that images responsive to the search phrase should not include birthday cakes. In this example, the sub-query model for "birthday cakes" may not be used to identify and/or rank images based on a determination that the search phrase includes an anti-sub query term.

Alternatively, or additionally, the detection of an anti-sub-query term in a search phrase can be used to change the manner in which the images are ranked. For example, assume that the search phrase "party ideas without birthday cakes" is determined to include the anti-sub query term "without," which is followed by the sub-query "birthday cakes." In this example, the sub-query model for "birthday cakes" can be used to reduce the scores of images and/or demote images provided in response to the search phrase. For example, the aggregate relevance score for each image can be reduced based on the image relevance score output by the sub-query model for "birthday cakes."

The identification of anti-sub query model terms can be performed in a manner similar to that for the identification of sub-queries, except that anti-sub query terms will be those terms that, when included in a search phrase with sub-queries, provide less than a minimum threshold search phrase score.

Figure 5:
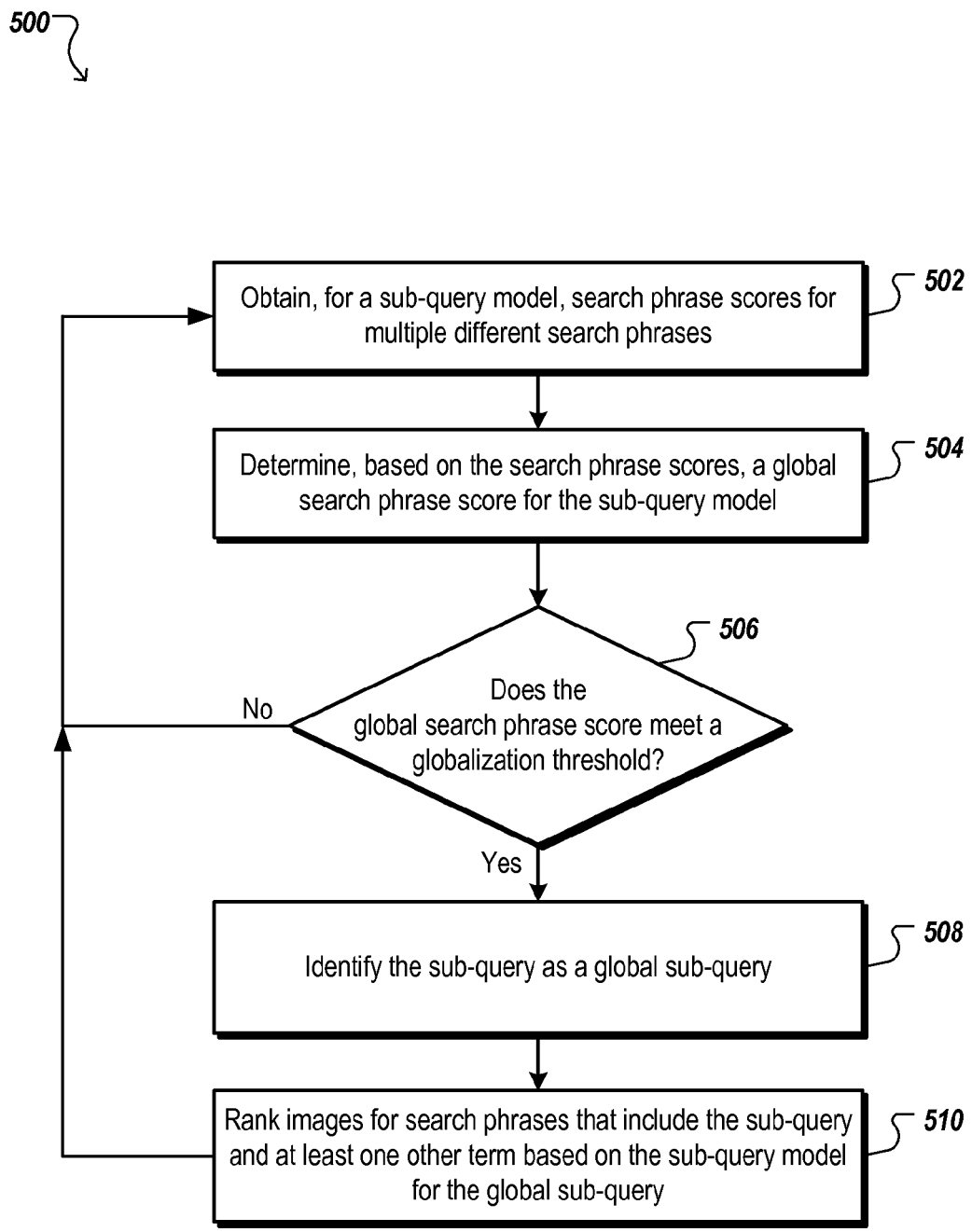
FIG. 5 is a flow chart of an example process for identifying a global sub-query.

FIG. 5 is a flow chart of an example process 500 for identifying a global sub-query. The process 500 can be performed, for example, by the Sub-Query Model Apparatus 120, the search system 110, or another data processing apparatus. The process 500 can also be implemented as instructions stored on computer storage medium, and execution of the instructions by a data processing apparatus can cause the data processing apparatus to perform the operations of the process 500.

Search phrase scores for multiple different search phrases are obtained for a sub-query model (502). For example, assume that a sub-query model for the sub-query model for the sub-query "birthday cake" has been evaluated for use as a model for search phrases including "big birthday cake," "tasty birthday cake," and "multi-layer birthday cake." In this example, an independent search phrase score for the sub-query model may have been determined with respect to each of these search phrases. Thus, each of these search phrase scores represents a measure of similarity between the interaction rankings of the responsive images for the corresponding search phrase and the sub-query model rankings that resulted from application of the sub-query model for "birthday cake" to the responsive images. These search phrase scores can be obtained, for example, from a data store that stores the search phrase scores for the sub-query models.

A global search phrase score is determined for the sub-query model (504). In some implementations, the global search phrase score is determined based on an aggregate measure of the search phrase score and the additional search phrase score. The aggregate measure can be a value resulting from a mathematical combination of the obtained search phrase scores. For example, the global search phrase score can be determined based on an average value of the search phrase scores or a weighted average of the search phrase scores (e.g., where the weight can correspond to a query volume for the corresponding search phrase or another weight source). Other aggregate measures can also be used, such as a sum or a logarithmic combination of the search phrase scores.

A determination is made whether the global search phrase score meets a globalization threshold (506). The globalization threshold is a value that the global search phrase score must meet to deem the sub-query a global sub-query. If the global search phrase score does not meet the globalization threshold, search phrase scores can be obtained for another sub-query model (502), and the process can iterate.

If the global search phrase score meets the globalization threshold, the sub-query can be identified as a global sub-query (508). A global sub-query has a corresponding sub-query model that can be used to identify and/or rank images for multiple different search phrases that each includes the sub-query. For example, if the sub-query "birthday cake" is identified as a global sub-query, the sub-query model that has been trained for "birthday cake" can be used in multiple different search phrases that include the sub-query "birthday cake." In this example, the sub-query model for "birthday cake" may be used for search phrases such as "birthday cake for girls," "birthday cake for grandma," birthday cake for wife," or other search phrases that include the term birthday cake.

In some implementations, the sub-query model for a global sub-query can be used to identify and/or rank images for a search phrase that includes the sub-query, even if the sub-query model has not been evaluated with respect to that particular search phrase. For example, assume that the sub-query "birthday cake" has not been evaluated for use with the search phrase "birthday cakes for grandma." In this example, if the search phrase "birthday cake" has been identified as a global sub-query, the sub-query model for "birthday cake" can be used to identify and/or rank images responsive to the search phrase "birthdate cake for grandma," despite the model having not been evaluated for use with this particular search phrase.

Images for at least one additional search phrase that includes the sub-query are ranked using the sub-query model for the global sub-query (510). In some implementations, the search phrases for which the sub-query model is used to rank images include search phrases that include at least one other term in addition to the sub-query. For example, if the sub-query is "birthday cake," the sub-query model may be used to rank images for "best birthday cake." As discussed above, the search phrases for which the sub-query model can be used to identify and/or rank images can include search phrases beyond those for which the sub-query model has been evaluated.

Some search phrases that include the global sub-query may also include another global sub-query. For example, assume that the search phrase "vintage birthday cake" is received, and that the sub-query "vintage" has been identified as a global sub-query. In this example, the sub-query model for "birthday cake" and the sub-query model for "vintage" can be used to identify and/or rank images responsive to the search phrase "vintage birthday cake."

The images can be ranked based on a combination of the image relevance scores that are output by the sub-query models. In some implementations, each sub-query model can be used to generate an image relevance score for each image, and the aggregate image relevance score can be a combination of the image relevance scores. For example, the aggregate image relevance score for each image can be an average of the image relevance scores output by the image relevance models. In turn, each image can be ranked based on the aggregate image relevance score. Other combinations of the image relevance score can be used as the aggregate image relevance score. For example, the aggregate image relevance score for an image could be a sum or product of the image relevance scores for the image or another mathematical combination (e.g., a weighted average) of the image relevance scores.

Figure 6:
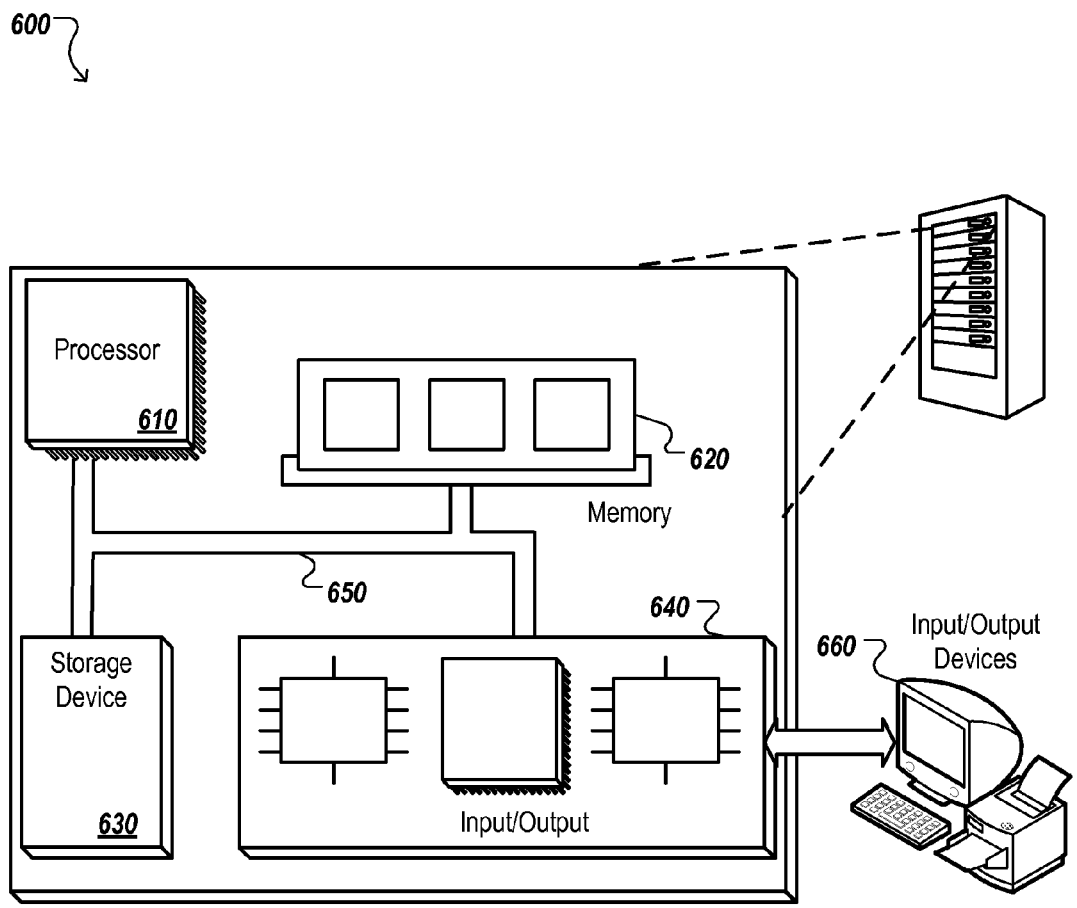
FIG. 6 is a block diagram of an example data processing apparatus.

FIG. 6 is a block diagram of an example data processing apparatus 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
  identifying responsive images for a search phrase that includes two or more terms;
  determining, by one or more processors, interaction rankings for each of the responsive images based on a number of user interactions with the responsive image;
  creating, by one or more processors, two or more sub-queries based on the search phrase, the sub-queries each being a proper subset of the two or more terms;
  for each sub-query from the two or more sub-queries:
    determining, by one or more processors, sub-query model rankings for the responsive images based on a sub-query model for the sub-query and visual features of the responsive images, the sub-query model being an image relevance model for the sub-query; and determining, by one or more processors, a search phrase score for the sub-query model, the search phrase score being based on a measure of similarity between positions of the responsive images in each of the interaction rankings and the sub-query model rankings; and selecting, based on the search phrase scores for the sub-queries, one of the sub-query models as a model for the search phrase, the selected sub-query model having a search phrase score that meets a threshold search phrase score.

2. The method of claim 1, wherein determining interaction rankings for images in the responsive images comprises:

ranking a first image from the responsive images as a highest ranked image, the first image having a highest number of user interactions among the responsive images;

ranking a second image from the responsive images as a second highest ranked image, the second image having a second highest number of user interactions among the responsive images; and ranking each unranked image in the responsive images in descending order according to the number of user interactions with the unranked image.

3. The method of claim 1, further comprising creating an interaction histogram based on the interaction rankings and the numbers of user interactions with the responsive images.

4. The method of claim 3, further comprising creating a sub-query histogram based on the sub-query model rankings and the number of user interactions with the responsive images.

5. The method of claim 4, wherein determining a search phrase score comprises:

determining a level of match between the interaction histogram and the sub-query histogram; and determining the search phrase score based on the level of match between the interaction histogram and the sub-query histogram.

6. The method of claim 1, further comprising:

obtaining, for the selected sub-query model, an additional search phrase score specifying a measure of similarity between interaction rankings of other images responsive to another search phrase and sub-query model rankings of the other images based on the selected sub-query model; and determining a global search phrase score for the selected sub-query model, the global search phrase score being determined based on an aggregate measure of the search phrase score and the additional search phrase score.

7. The method of claim 6, further comprising:

determining that the global search phrase score for the selected sub-query model meets a global search phrase score threshold;

identifying the sub-query corresponding to the selected sub-query model as a global sub-query based on the determination that the global search phrase score meets the global search phrase threshold; and ranking images for at least one additional search phrase that includes the sub-query and at least one other term based on the selected sub-query model.

8. A non-transitory computer storage medium encoded with a computer program, the program comprising instructions that when executed by data processing apparatus cause the data processing apparatus to perform operations comprising:

identifying responsive images for a search phrase that includes two or more terms;

determining interaction rankings for each of the responsive images based on a number of user interactions with the responsive image;

creating two or more sub-queries based on the search phrase, the sub-queries each being a proper subset of the two or more terms;

for each sub-query from the two or more sub-queries:

determining sub-query model rankings for the responsive images based on a sub-query model for the sub-query and visual features of the responsive images, the sub-query model being an image relevance model for the sub-query; and determining a search phrase score for the sub-query model, the search phrase score being based on a measure of similarity between positions of the responsive images in each of the interaction rankings and the sub-query model rankings; and selecting, based on the search phrase scores for the sub-queries, one of the sub-query models as a model for the search phrase, the selected sub-query model having a search phrase score that meets a threshold search phrase score.

9. The computer storage medium of claim 8, wherein determining interaction rankings for each of the responsive images comprises:

ranking a first image from the responsive images as a highest ranked image, the first image having a highest number of user interactions among the responsive images;

ranking a second image from the responsive images as a second highest ranked image, the second image having a second highest number of user interactions among the responsive images; and ranking each unranked image in the responsive images in descending order according to the number of user interactions with the unranked image.

10. The computer storage medium of claim 8, wherein the instructions cause the data processing apparatus to perform operations comprising creating an interaction histogram based on the interaction rankings and the numbers of user interactions with the responsive images.

11. The computer storage medium of claim 10, wherein the instructions cause the data processing apparatus to perform operations comprising creating a sub-query histogram based on the sub-query model rankings and the number of user interactions with the responsive images.

12. The computer storage medium of claim 11, wherein determining a search phrase score comprises:

determining a level of match between the interaction histogram and the sub-query histogram; and determining the search phrase score based on the level of match between the interaction histogram and the sub-query histogram.

13. The computer storage medium of claim 8, wherein the instructions cause the data processing apparatus to perform operations comprising:

obtaining, for the selected sub-query model, an additional search phrase score specifying a measure of similarity between interaction rankings of other images responsive to another search phrase and sub-query model rankings of the other images based on the selected sub-query model; and determining a global search phrase score for the selected sub-query model, the global search phrase score being determined based on an aggregate measure of the search phrase score and the additional search phrase score.

14. A system comprising:
a data store; and
one or more data processing apparatus that interact with the data store and execute instructions that cause the one or more computers to perform operations comprising:
identifying responsive images for a search phrase that includes two or more terms;
determining interaction rankings for each of the responsive images based on a number of user interactions with the responsive image;
creating two or more sub-queries based on the search phrase, the sub-queries each being a proper subset of the two or more terms;
for each sub-query from the two or more sub-queries:
determining sub-query model rankings for the responsive images based on a sub-query model for the sub-query and visual features of the responsive images, the sub-query model being an image relevance model for the sub-query; and
determining a search phrase score for the sub-query model, the search phrase score being based on a measure of similarity between positions of the responsive images in each of the interaction rankings and the sub-query model rankings; and
selecting, based on the search phrase scores for the sub-queries, one of the sub-query models as a model for the search phrase, the selected sub-query model having a search phrase score that meets a threshold search phrase score.

15. The system of claim 14, wherein determining interaction rankings for each of the responsive images comprises:
ranking a first image from the responsive images as a highest ranked image, the first image having a highest number of user interactions among the responsive images;
ranking a second image from the responsive images as a second highest ranked image, the second image having a second highest number of user interactions among the responsive images; and
ranking each unranked image in the responsive images in descending order according to the number of user interactions with the unranked image.

16. The system of claim 14, wherein the instructions cause the one or more data processing apparatus to perform operations comprising creating an interaction histogram based on the interaction rankings and the numbers of user interactions with the responsive images.

17. The system of claim 16, wherein the instructions cause the one or more data processing apparatus to perform operations comprising creating a sub-query histogram based on the sub-query model rankings and the number of user interactions with the responsive images.

18. The system of claim 17, wherein determining a search phrase score comprises:
determining a level of match between the interaction histogram and the sub-query histogram; and
determining the search phrase score based on the level of match between the interaction histogram and the sub-query histogram.

19. The system of claim 14, wherein the instructions cause the one or more data processing apparatus to perform operations comprising:
obtaining, for the selected sub-query model, an additional search phrase score specifying a measure of similarity between interaction rankings of other images responsive to another search phrase and sub-query model rankings of the other images based on the selected sub-query model; and
determining a global search phrase score for the selected sub-query model, the global search phrase score being determined based on an aggregate measure of the search phrase score and the additional search phrase score.

20. The system of claim 19, wherein the instructions cause the one or more data processing apparatus to perform operations comprising:
determining that the global search phrase score for the selected sub-query model meets a global search phrase score threshold;
identifying the sub-query corresponding to the selected sub-query model as a global sub-query based on the determination that the global search phrase score meets the global search phrase threshold; and
ranking images for at least one additional search phrase that includes the sub-query and at least one other term based on the selected sub-query model.

* * * * *